L. DIAZ.
MOLD.
APPLICATION FILED FEB. 5, 1908.
912,829.
Patented Feb. 16, 1909.
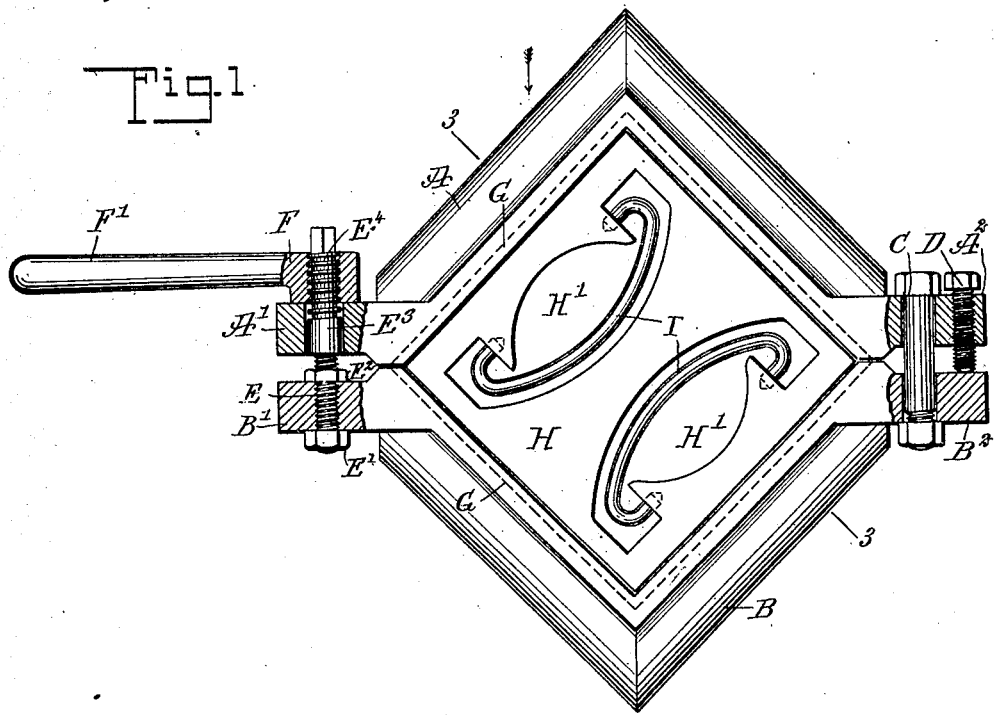
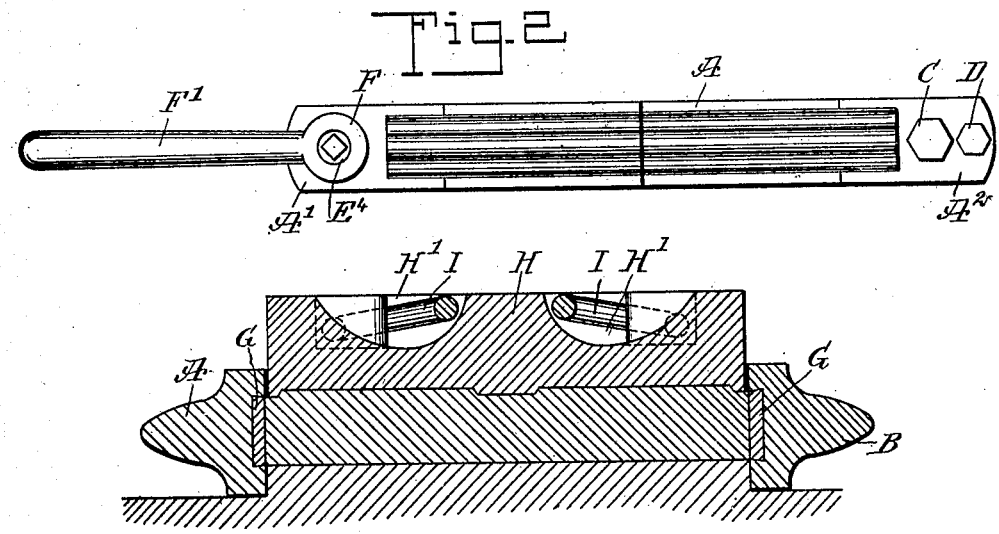
WITNESSES
INVENTOR
Ladislao Diaz
BY Munn & Co.
ATTORNEYS

UNITED STATES PATENT OFFICE.

LADISLAO DIAZ, OF HABANA, CUBA.

MOLD.

No. 912,829.        Specification of Letters Patent.        Patented Feb. 16, 1909.

Application filed February 5, 1908. Serial No. 414,357.

*To all whom it may concern:*

Be it known that I, LADISLAO DIAZ, a citizen of the Republic of Cuba, and a resident of Habana, Cuba, have invented a new and Improved Mold, of which the following is a full, clear, and exact description.

The invention relates to the manufacture of tiles, flags and like articles, and its object is to provide a new and improved mold, arranged to permit of quick opening of the mold frame, for removal of the pressed article, and to allow convenient handling of the mold plate or die.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement, parts being in section; Fig. 2 is a side elevation of the same, looking in the direction of the arrow in Fig. 1; and Fig. 3 is a transverse section of the same on the line 3—3 of Fig. 1.

The mold frame is made in two sections A and B, approximately V-shape in form, and provided at their ends with integral lugs or flanges $A'$, $A^2$ and $B'$, $B^2$, of which the lugs $A^2$, $B^2$ are connected with each other by a bolt C, and a set screw D screws in the lug $A^2$ and bears against the other lug $B^2$, as plainly indicated in Fig. 1. In the lug $B'$ is secured a screw rod E by nuts $E'$, $E^2$, and the said screw rod has an unthreaded portion $E^3$ extending loosely through an aperture in the lug $A'$, the threaded end $E^4$ of the said screw rod E being engaged by a nut F having a handle $F'$ under the control of the operator, for turning the nut F to bear against the lug $A'$ and to thus draw the frame sections A and B towards each other, to properly close the frame or to open the same on screwing the nut F outward on the threaded portion $E^4$. By the arrangement described the frame sections A and B can be readily opened sufficiently for the operator to remove the pressed article from the frame. From the foregoing it will be seen that by the use of the handled nut F and the screw rod E an even and uniform pressure can be exerted on the frame sections A and B, to properly and accurately close the same. By the use of the set screw D the frame sections A and B can be adjusted to take up wear.

In order to compensate for wear on the inner faces of the frame sections A and B, the latter are provided at their inner faces with recesses, into which fit wearing plates G, which can be readily removed and replaced by new ones in case they are worn out, thus permitting the use of the frame for a long time.

A face plate or die H, fitting into the mold frame for pressing the plastic material therein, is provided on its top surface with recesses $H'$, into which are adapted to fold handles I, pivoted on the plate or die H below the top surface thereof, as plainly indicated in Figs. 1 and 3. By the arrangement described the handles I can be readily folded into the recesses $H'$, so as to be below the top surface of the plate or die H, to present no obstruction to the plunger for pressing the die down into the mold frame. When the plunger has been retracted, the handles I can be readily swung outward, to permit the operator to conveniently lift the face plate or die H out of the mold frame.

From the foregoing it will be seen that by the arrangement described, the mold is always in proper condition for accurately forming the tiles, flags and like articles, and at the same time the mold frame can be readily opened and closed and properly adjusted by the means above set forth.

Having thus described my invention, I claim as new and desire to secure by Letters Patent:

1. A mold having a metal frame made in sections provided at their ends with outwardly extending lugs, a bolt connecting one pair of lugs at one end of the frame, a set screw threaded through one of the lugs adjacent to the bolt and bearing against the other, the other pair of lugs being provided with registering openings, a screw threaded rod extending through the openings, nuts engaging said rod upon each side of one of the lugs, a handled nut engaging the rod outside of the other lug, said rod being provided with an unthreaded portion, within the opening of the lug adjacent to the handled nut for the purpose set forth.

2. A mold having a mold frame made in sections, having lugs at the ends, a bolt connecting the lugs at one end of the frame with each other, a set screw adjacent to the said bolt and screwing in one of the lugs and bearing on the other lug, a screw rod fixed in one of the lugs at the other end of the frame and extending through and guided in the adjacent lug, and a handled nut screwing on the said screw rod and bearing against the said guiding lug.

In testimony whereof I have signed my name to this specification in the presence of two subscribing witnesses.

LADISLAO DIAZ.

Witnesses:
POLIDORO ABLAMDE,
AMADEO PUJOL.